US011905900B1

(12) United States Patent
Baur et al.

(10) Patent No.: US 11,905,900 B1
(45) Date of Patent: Feb. 20, 2024

(54) EXHAUST SYSTEM COMBUSTION FOR RAPID CATALYST HEATING

(71) Applicant: SAUDI ARABIAN OIL COMPANY, Dhahran (SA)

(72) Inventors: Andrew Baur, Whitmore Lake, MI (US); Xin Yu, New Hudson, MI (US); Anqi Zhang, Canton, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/066,645

(22) Filed: Dec. 15, 2022

(51) Int. Cl.

| | |
|---|---|
| ***F02D 41/02*** | (2006.01) |
| ***F02P 9/00*** | (2006.01) |
| ***F01N 3/20*** | (2006.01) |
| ***F02D 41/30*** | (2006.01) |

(52) U.S. Cl.
CPC ......... *F02D 41/0255* (2013.01); *F01N 3/204* (2013.01); *F01N 3/2013* (2013.01); *F01N 3/2033* (2013.01); *F02D 41/3017* (2013.01); *F02D 41/3076* (2013.01); *F02P 9/002* (2013.01); *F01N 3/2006* (2013.01); *F01N 2610/03* (2013.01)

(58) Field of Classification Search
CPC ............. F02D 41/0255; F02D 41/3017; F02D 41/3076; F01N 3/2013; F01N 3/2033; F01N 3/204; F01N 3/2006; F01N 2610/03; F02P 9/002
See application file for complete search history.

(56) References Cited

U.S. PATENT DOCUMENTS

| | | | | |
|---|---|---|---|---|
| 4,651,524 | A * | 3/1987 | Brighton | F01N 3/032 60/303 |
| 5,357,749 | A | 10/1994 | Ohsuga et al. | |
| 5,609,021 | A * | 3/1997 | Ma | F01N 3/22 60/285 |
| 5,996,338 | A | 12/1999 | Hirota | |
| 6,023,929 | A * | 2/2000 | Ma | F02D 41/0087 123/481 |
| 9,297,320 | B2 | 3/2016 | Hilditch et al. | |
| 10,563,605 | B2 | 2/2020 | Dudar | |
| 2002/0023429 | A1* | 2/2002 | Kuper | F01N 13/009 123/282 |
| 2013/0047607 | A1* | 2/2013 | Petrovic | F02D 21/08 60/274 |
| 2016/0272189 | A1* | 9/2016 | Inoue | B60L 53/63 |
| 2020/0232359 | A1* | 7/2020 | Kaack | F01N 3/101 |
| 2021/0396391 | A1 | 12/2021 | Carpenter et al. | |

* cited by examiner

*Primary Examiner* — Brandon D Lee
(74) *Attorney, Agent, or Firm* — Osha Bergman Watanabe & Burton LLP

(57) ABSTRACT

A motor system includes an engine having one or more cylinders, an electronic control unit, an exhaust treatment system in fluid connection with and downstream of the one or more cylinders. The exhaust treatment system includes an exhaust line, a combustion zone downstream, a combustion ignition source in the combustion zone, a catalyst downstream of an in thermal communication with the combustion zone. A method of heating a catalyst during an engine cold start and a method of initiating regular operating conditions of an engine having one or more cylinders are also described.

19 Claims, 3 Drawing Sheets

EXHAUST SYSTEM COMBUSTION FOR RAPID CATALYST HEATING

BACKGROUND

Environmental concerns and government regulations have led to efforts focused on improving the removal of noxious combustion by-products and exhaust pollutants from vehicle engine exhaust gases. Common exhaust lines are equipped with several components in order to reduce pollutants from the high concentrations observed directly from the engine to low concentrations at the tailpipe. For example, commonly used catalysts comprise precious metals to efficiently convert exhaust gas pollutants, such as hydrocarbons, carbon monoxide, nitrogen oxides (NOx), and particulate matter, to relatively harmless components including water ($H_2O$), nitrogen ($N_2$), and carbon dioxide ($CO_2$).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a motor system that includes an engine having one or more cylinders, an electronic control unit, an exhaust treatment system in fluid connection with and downstream of the one or more cylinders. The exhaust treatment system includes an exhaust line, a combustion zone downstream, a combustion ignition source in the combustion zone, a catalyst downstream of an in thermal communication with the combustion zone.

In another aspect, embodiments disclosed herein relate to a method of heating a catalyst during an engine cold start. The method includes providing a mixture of air and fuel to an exhaust treatment system, operating the combustion zone ignition source to combust the mixture of air and fuel, thereby generating a combustion gas in the exhaust treatment system, and heating the catalyst with the generated combustion gas.

In another aspect, embodiments disclosed herein relate to a method of initiating regular operating conditions of an engine having one or more cylinders. The method includes heating a catalyst of an exhaust treatment system in fluid connection with the engine, operating an electronic control unit to deactivate the combustion zone ignition source, and operating the electronic control unit to initiate regular engine operating conditions.

Other aspects and advantages of the claimed subject matter will be apparent from the following description and the appended claims.

DETAILED DESCRIPTION

A large portion of the exhaust emissions are produced during the cold start phase, resulting from low conversion efficiency of many exhaust gas purifying catalysts in cold conditions. As such, under cold start conditions, residual pollutants often remain, making the removal of such pollutants a highly desirable goal.

Emissions from combustion engines are often subject to catalytic conversion via an activated catalyst on vehicle exhaust lines for efficient conversion to inert components, such as water ($H_2O$), carbon dioxide ($CO_2$), and nitrogen ($N_2$). To reduce these emissions, the catalysts equipped in modern exhaust systems require high temperatures for efficient conversion and are ineffective for a significant period after engine start (i.e., "an engine cold start"), during which 80% to 90% of exhaust emissions, or "pollutants," are attributable to a cold catalyst.

Generally, a catalyst often requires an elevated temperature to operate effectively, thus hindering the conversion of pollutants during an engine cold start. The term "engine cold start" or "cold start phase" refers to a period of time after initiation of engine operations during which time, a catalyst of the exhaust line has not reached an activation temperature. As such, a large percentage of noxious emissions from exhaust lines are emitted during this phase. Thus, rapidly and efficiently warming the catalyst without increasing exhaust emissions is a major challenge to achieve acceptable emission output.

Embodiments in accordance with the present disclosure generally relate to systems and methods for reducing the output of exhaust emissions, or "pollutants," generated from an engine during a cold start phase. In one or more embodiments, the concentration of pollutants during an engine cold start may be reduced using the systems and methods disclosed herein. The systems of the present disclosure are applicable to any engine. The systems may also be used in the exhaust line of any conventional or hybrid vehicles.

Motor System

Figure 1:
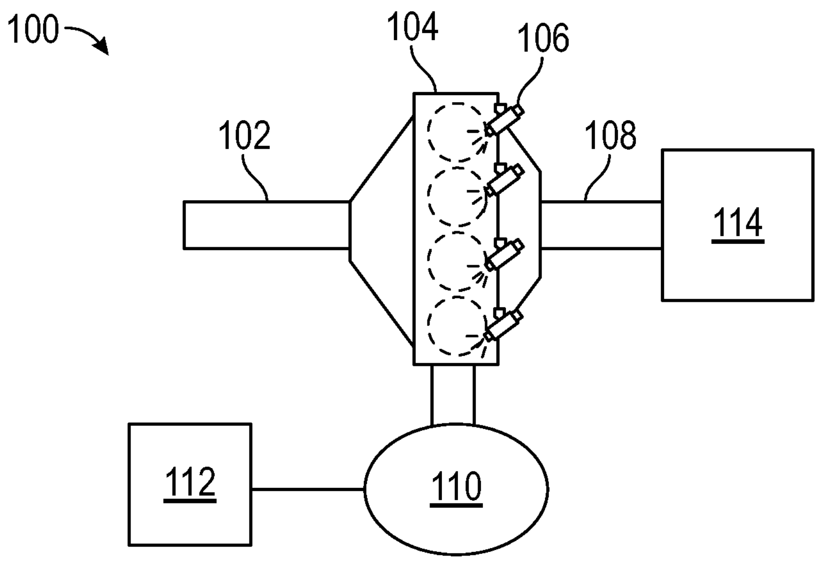
FIG. 1 is a schematic of an engine in fluid connection with an exhaust treatment system in accordance with one or more embodiments.

In one aspect, embodiments relate to a motor system that includes an electronic control unit, an engine having a cylinder bank, and an exhaust treatment system in fluid connection with and downstream of the cylinder bank. As shown in FIG. 1, an engine 104 of a motor system 100 is in fluid connection with an exhaust line 108 of an exhaust treatment system 114. The engine 104 is an engine having a cylinder bank. Non-limiting examples of the engine 104 may include a positive ignition engine or a compression ignition engine, such as a spark-ignition engine or a reciprocating ignition engine, respectively. In one or more embodiments, engine 104 is coupled to a rotating output shaft (not shown). During an engine cold start phase, the engine 104 may rotate such that the rotating engine is an air pump. For example, the engine 104 may be a reciprocating piston engine, which acts as an air pump. The engine 104 may be configured to operate via direct fuel injection, port fuel injection, or both.

An electronic control unit (ECU) 112 may be included with the exhaust treatment system, the engine, or both. The ECU 112 may be located in any location of the engine compartment. In one or more embodiments, the motor system 100 includes an ECU 112 in electrical connection 110 with one or more units of the engine and one or more units of the exhaust treatment system. The ECU 112 may be electrically connected to one or more exhaust treatment system units, such as an combustion zone ignition source disposed in a combustion zone on the exhaust line, a catalyst downstream of and in thermal communication with the combustion zone, at least one sensor of the exhaust line, or combinations thereof. The ECU 112 may be electrically connected to one or more engine components, such as a rotating output shaft, an engine having a cylinder bank, at least one spark plug, at least one fuel injector, among other engine components.

In one or more embodiments, air is fed to an intake manifold of the engine 104. Air is fed through an air inlet 102 in fluid connection with the cylinder bank of the engine 104. The cylinder bank may include one or more cylinders. In one or more embodiments, an intake manifold is in fluid communication with the one more cylinders. By way of an example, FIG. 1 is shown with four cylinders, but one of skill in the art would recognize that any number of cylinders may be used, such as 1, 2, 3, 4, 5, 6, 8, 10, or 12, each arranged in an in-line, V-, or H-pattern. The one or more cylinders includes at least one spark plug (not shown) and at least one fuel injector 106 such that each of the one or more cylinders independently includes a spark plug and a fuel injector. A fuel stream is injected via the at least one fuel injectors 106 of the one or more cylinders of the cylinder bank of the engine 104 and mixed with the air fed into the cylinder bank by air inlet 102 to generate a mixture of air and fuel. In one or more embodiments, the rotation of the engine 104 may mix the air and fuel. The mixture of air and fuel may be passed from the cylinder bank of the engine 104 to an exhaust line 108.

During an engine cold start phase, the ECU 112 deactivates an engine ignition source such that ignition of fuel does not occur in the engine 104. In one or more embodiments, the ECU 112 deactivates all spark plugs present in the cylinder bank such that a combustion reaction does not occur in the engine 104. The ECU 112 may include partial deactivation modes such that specific spark plugs of the cylinder banks are deactivated, while others are activated. In such embodiments, ignition occurs in the cylinders with activated spark plugs and ignition does not occur in cylinders with deactivated spark plugs.

In one or more embodiments, the motor system includes an exhaust treatment system 114. The cylinder bank of one or more embodiments is fluidly connected to an exhaust treatment system 114 via exhaust line 108. As one of ordinary skill may appreciate, at least one exhaust valve (not shown) may be disposed in the exhaust line 108 downstream of and proximate to the engine 104. The exhaust valve may be electrically connected to the ECU 112. In such embodiments, the ECU 112 may control an exhaust valve timing.

In one or more embodiments, the exhaust valve is electrically deactivated. The exhaust valve may be mechanically actuated valves. In such embodiments, the mechanically actuated valves may be configured to be open as a part of the engine cycle. The exhaust valve timing may be adjusted to open the exhaust valve during an engine cold start phase to provide a mixture of air and fuel to the exhaust treatment system. By way of a non-limiting example, the exhaust valve may be mechanically timed to the crankshaft, where the ECU 112 can electrically adjust the timing of opening or closing of the exhaust valve. In such embodiments, the timing adjusted by the ECU 112 can be dependent on one or more engine parameters, such as catalyst temperature.

Figure 2A:
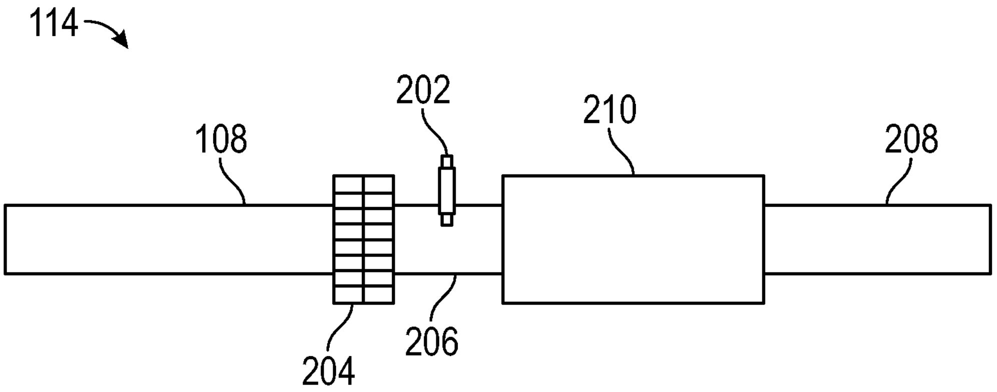
FIGS. 2A-2C are schematics of exhaust treatment systems in accordance with one or more embodiments.
Figure 2B:
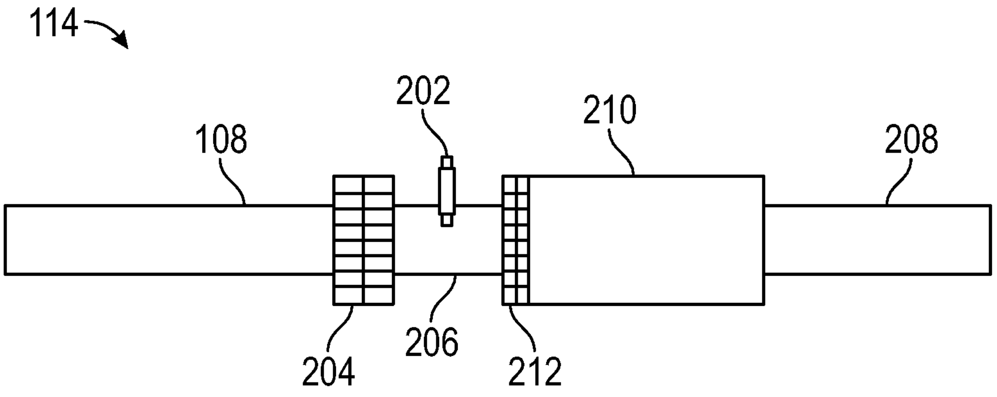
Figure 2C:
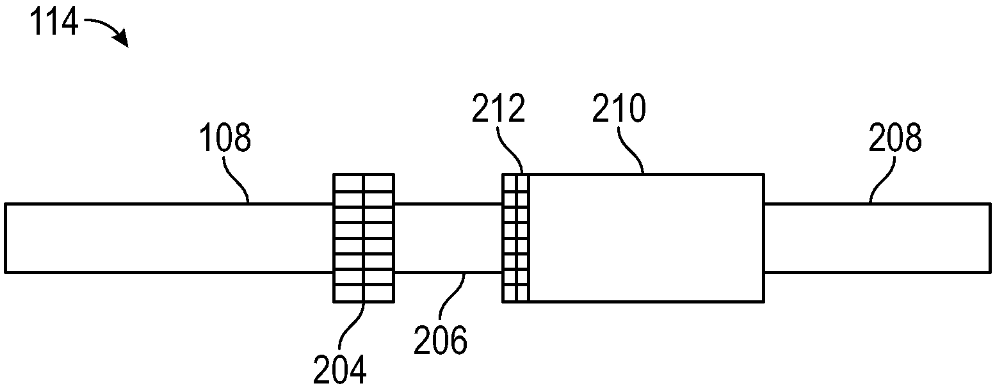

FIGS. 2A, 2B, and 2C are schematics of an exhaust treatment system 114 of one or more embodiments. As shown in FIGS. 2A, 2B, 2C, the exhaust treatment system includes an exhaust line 108 in fluid connection with a cylinder bank of the engine (FIG. 1), a combustion zone 206, a flame arrestor 204 in the exhaust line and upstream of the combustion zone 206, an combustion zone ignition source (e.g., 202 FIGS. 2A and 2B) in the combustion zone 206, and a catalyst 210 downstream of and in thermal communication with the combustion zone 206.

In one or more embodiments, the air pump provided by the rotation of engine 104 may provide an air flow rate that prevents flame propagation from the exhaust line to one or more components of the engine 104. In such embodiments, the air flow rate may be above the flame speed of the combusted mixture of air and fuel such that a flame arrestor 204 of the combustion zone 206 is not required.

In one or more embodiments, the flame arrestor 204 in the exhaust line 108 upstream of the combustion zone 206 prevents backflow of a combustion reaction, such as a backflow of thermal energy, pressure, flame propagation, or combinations thereof from the combustion zone 206 of the exhaust line 108 to the engine. The flame arrestor 204 may be sized to fit the exhaust line of the exhaust treatment system. In one or more embodiments, the flame arrestor 204 is designed to minimally impact peak exhaust flow during peak power operation. The flame arrestor 204 may be designed for a range of different pressures and temperatures such that the flame arrestor 204 may be used in an exhaust treatment system of a motor system.

As one of ordinary skill may appreciate, the flame arrestor 204 may be a commercially available device. The flame arrestor 204 may be a passive device with no moving parts. The flame arrestor 204 may have a substrate or a matrix of metal with a high surface area to volume ratio that removes heat from the propagating flame such that the flame is prevented from reentering the engine from the exhaust system. Non-limiting materials that the flame arrestor 204 may be made from include a material selected from the group consisting of aluminum, stainless steel, iron, and combinations thereof.

The combustion zone ignition source (e.g., 202 FIGS. 2A and 2B) of one or more embodiments is in electrical connection to the ECU 112 of FIG. 1. In one or more embodiments, a mixture of air and fuel is provided to the combustion zone 206 during an engine cold start phase. The combustion zone ignition source 202 is operated such that the combustion zone ignition source is activated to ignite the mixture of air and fuel, causing combustion of the mixture of air and fuel. The operation of the combustion zone ignition source generates a combustion gas via the combustion reaction.

The combustion reaction may ignite pollutants such as particulate matter (PM), hydrocarbons (HCs), nitrous oxide (NOx), and carbon monoxide (CO) of the mixture of air and fuel. In one or more embodiments, the combustion reaction of the air and fuel mixture generates a combustion gas and heat. The heat generated from the combustion reaction may be absorbed by the catalyst 210 in thermal connection with the combustion zone 206. Accordingly, the catalyst 210 may be heated via absorption of heat from the combusted gas.

As shown in FIGS. 2A and 2B, the combustion zone ignition source 202 may be located in the combustion zone 206. In such embodiments, the combustion zone ignition source 202 may be a spark plug or a glow plug. In one or more embodiments, the combustion zone ignition source 202 may include one or more spark plugs, one or more glow plugs, or combinations thereof. The combustion zone ignition source 202 may be in electrical connection with an ECU, such as the ECU 112 of FIG. 1. Activation and deactivation of the combustion zone ignition source 202 may be controlled by the ECU 112 such that combustion of a mixture of air and fuel is provided.

As shown in FIGS. 2B and 2C, the catalyst 210 of the exhaust treatment system may include an electric heating unit 212 coupled to a catalyst 210. In such embodiments, the electric heating unit 212 is in thermal communication with the combustion zone 206. The electric heating unit 212 heats the catalyst 210 to an activation temperature, such that the catalyst is activated. In one or more embodiments, the electric heating unit 212 provides additional heat to the catalyst 210. In such embodiments, the electric heating unit 212 is an additional combustion zone ignition source. The electric heating unit 212 may be in electric connection with the ECU 112 of FIG. 1, such that the electric heating unit is activated and deactivated by the ECU 112

In embodiments such as FIG. 2C, the electric heating unit 212 may heat the mixture of air and fuel in the combustion zone 206 such that the mixture of air and fuel is combusted in the combustion zone 206 where an combustion zone ignition source 202 is not provided. In such embodiments, the electrical heating unit 212 may include a surface in thermal connection with the mixture of air and fuel present in the combustion zone. The surface of the electrical heating unit 212 may be heated to a temperature such that the mixture of air and fuel is heated to an autoignition temperature. The autoignition temperature may depend on the type of fuel being injected to form the mixture of air and fuel, such as various grades of gasoline. A surface in thermal connection with the combustion zone may be heated to the autoignition temperature of gasoline, such as above 700° C., causing the mixture of air and fuel to be ignited.

Embodiments in which the combustion zone ignition source 202 is a heated catalyst, a glow plug, or both, the combustion zone ignition source 202 is constantly activated. The combustion zone ignition source 202 may be a spark plug. The spark plug may be repeatedly activated and deactivated (or "pulsed") at an ignition rate. The ignition rate may be at a rate in which the spark plugs is pulsed multiple times per second.

As one of ordinary skill may appreciate, one or more additional exhaust treatment units may be included downstream of the catalyst on exhaust line 208 of FIGS. 2A-2C. One or more additional exhaust treatment units may include a particulate filter, an additional catalytic unit, or both.

In one or more embodiments, the exhaust treatment system 114 may include at least one temperature sensor that detects a temperature of the catalyst 210. The at least one temperature sensor may be located upstream of and proximate to the catalyst in the combustion zone, coupled to the catalyst, downstream of and proximate to the catalyst, or combinations thereof.

In one or more embodiments, a temperature of the catalyst is computationally modelled. The computational model may include the use of a lumped-element thermal model. In one or more embodiments, the ECU may model the temperature of the catalyst. As one of ordinary skill may appreciate, the computational models performed by the ECU may be application specific.

In one or more embodiments, the system described above decreases the emission of exhaust pollutants (e.g., CO, HCs, NOx) during an engine cold-start compared to a system without elements described above. The concentration of CO in exhaust emissions downstream of the catalyst may be in a range of 0 to 15,000 ppm. The concentration of HCs in exhaust emissions downstream of the catalyst may be in range of 0 to 1000 ppm. The concentration of NO in exhaust emissions downstream of the catalyst may be in a range from about 0 to 1000 ppm.

Method of Heating a Catalyst During an Engine Cold Start

Figure 3:
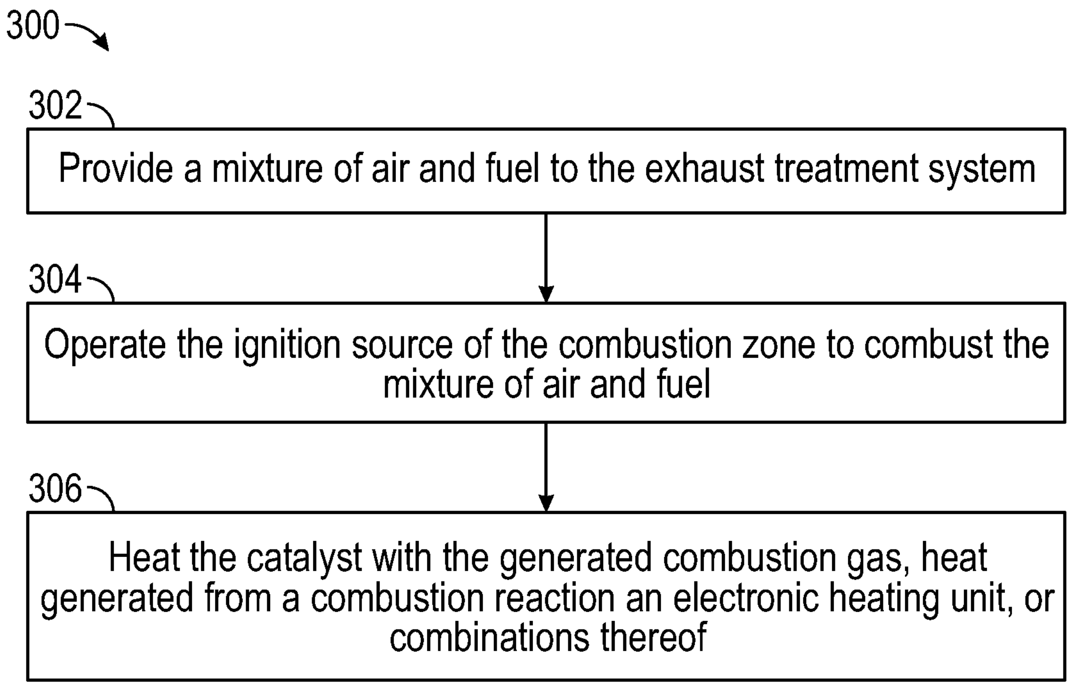
FIG. 3 is a block flow diagram of a method for heating a catalyst of an exhaust system in accordance with one or more embodiments.

In another aspect, embodiments of the present disclosure relate to a method of heating a catalyst during an engine cold start. FIG. 3 is a block flow diagram of a method 300 of heating a catalyst during an engine cold start according to one or more embodiments. One or more steps of the method 300 may be repeated such that a catalyst is sufficiently heated to provide an activated catalyst. The exhaust treatment system of the method 300 may be as described above. In one or more embodiments, the exhaust treatment system includes an exhaust line, a flame arrestor disposed in the exhaust line upstream of a combustion zone, an combustion zone ignition source disposed in the combustion zone, and a catalyst downstream of and in thermal connection with the combustion zone.

The method 300 includes a block 302 of providing a mixture of air and fuel to from a cylinder bank of an engine to the exhaust treatment system. The engine may be as described above. In one or more embodiments, the engine includes a cylinder bank, at least one spark plug, and a at least one fuel injections. In such embodiments, providing the mixture of air and fuel further includes deactivating the at least one spark plugs of the cylinder bank such that no ignition occurs in the cylinder bank. An air stream may be fed to the cylinder bank via an air inlet as described above. A fuel stream may be injected via the at least one fuel injectors, thereby generating the mixture of air and fuel in the cylinder bank of the engine. In one or more embodiments, providing the mixture of air and fuel to the exhaust treatment system includes rotating an engine in fluid communication with the cylinder bank, thereby providing an air pump.

The mixture of air and fuel may be passed through the engine and into the exhaust line. The mixture of air and fuel may be passed through the flame arrestor of the exhaust line to a combustion zone of the exhaust line. As noted above, the catalyst of one or more embodiments is in thermal connection with the combustion zone.

Block 304 of method 300 includes operating the combustion zone ignition source of the combustion zone to combust the mixture of air and fuel. Operating the combustion zone ignition source includes producing a combustion reaction of the mixture of air and fuel in the exhaust line. The combustion reaction of the mixture of air and fuel is an exothermic reaction that generates a combustion gas. In one or more embodiments, the catalyst may be heated with the heat generated from the combustion of the mixture of air and fuel as shown in block 306.

In one or more embodiments, heating the catalyst includes contacting the catalyst with the heat generated from the combustion of the mixture of air and fuel. The catalyst may be heated to an activation temperature. In one or more embodiments, the activation temperature may be a catalyst light off temperature. The term "light off temperature" refers to a temperature at which the catalyst is capable of converting emissions, such as the combustion gas, at a conversion efficiency of at least 50% or more to relatively harmless compounds.

In one or more embodiments, the catalyst is heated to a catalyst activation temperature. The catalyst activation temperature may include a temperature in which a conversion efficiency of the catalyst is non-zero. In one or more embodiments, the catalyst activation temperature is dependent upon the type of catalyst present in the exhaust treatment system. The catalyst activation temperature may refer to a catalyst light-off temperature, which refers to a temperature when the catalytic efficiency is about 50%. A non-limiting example of a light-off temperature may be greater than or equal to 400° C. when a three-way catalyst is provided as the catalyst of the exhaust treatment system.

In one or more embodiments, contacting the combustion gas with the catalyst includes converting the combustion gas to relatively harmless compounds. The catalyst converts molecules of the combustion gas to non-harmful compounds at a rate dependent upon the temperature of the catalyst. In such embodiments, a treated emission is produced.

The method may include monitoring at least one operating condition via at least one sensor. As described above, the at least one sensor may include at least one temperature sensor, at least one emissions sensor, or both, disposed in the exhaust line. The at least one sensor may be in electrical communication with an ECU as described above. The at least one sensor may monitor an operating condition, such as the temperature of the catalyst, the concentration the emissions, or both, as described above. One or more steps of the method 300 may be repeated based on one or more signals transmitted from the at least one sensor to the ECU until the activation temperature is achieved.

Method of Initiating Regular Engine Operating Conditions

Figure 4:
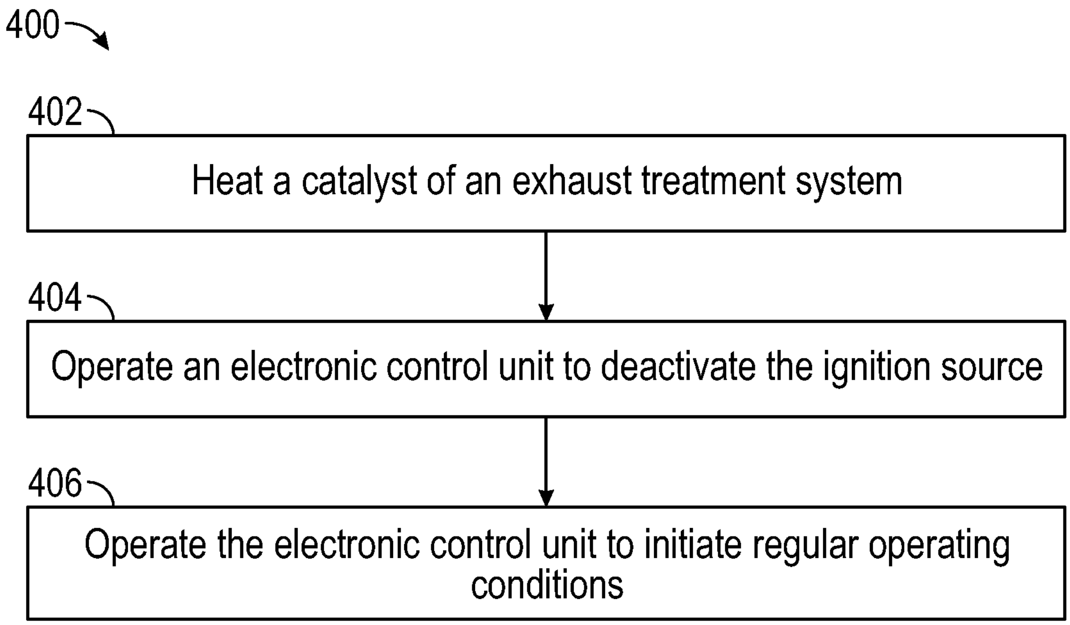
FIG. 4 is a block flow diagram of a method for initiating regular operating conditions of an engine in accordance with one or more embodiments.

In another aspect, embodiments described herein relate to a method of generating regular engine operating conditions after an engine cold start. The engine may include components as described above. The engine may include a cylinder bank, at least one spark plug, and at least one fuel injector. FIG. 4 is a block flow diagram of a method 400 of generating regular operating conditions in accordance with one or more embodiments.

In one or more embodiments, the method 400 may include block 402 of heating a catalyst in thermal connection with a combustion zone of an exhaust treatment system. The exhaust treatment system may be as described above. Heating the catalyst of the exhaust treatment system may include providing a mixture of air and fuel to the exhaust treatment system. In one or more embodiments, heating the catalyst of the exhaust system includes providing a combustion reaction using the mixture of air and fuel as described above.

Heating the catalyst of the exhaust treatment system may also include operating the combustion zone ignition source to combust the mixture of air and fuel, thereby generating a combustion gas as described above. Heating the catalyst of the exhaust treatment system may include contacting the catalyst with the generated combustion gas and heat generated from the combustion reaction to heat the catalyst. The catalyst of one or more embodiments may be heated to an activation temperature. The activation temperature may be transmitted via a signal from at least one temperature sensor proximate to the catalyst, at least one temperature sensor coupled to the catalyst, or both, to an electronic control unit. Non-limiting examples of the at least one temperature sensor includes virtual sensors, modeled sensors, or both.

In one or more embodiments, fuel injection is deactivated upon heating the catalyst to the activation temperature. In such embodiments, the combustion zone ignition source is activated such that ignition continues in the combustion zone until the air pump of the engine has pumped the mixture of unburned air and fuel mixture from the engine. The mixture of unburned air and fuel may be completely pumped out in a of the engine such that the combustion zone ignition source ignites the remaining mixture of unburned air and fuel in the combustion zone. The combustion zone ignition source may combust a portion of the mixture of unburned air and fuel. In such embodiments, a gap (or "slug") of pure air may be pumped into the exhaust system by the engine to provide a separation gas to remove the unburned mixture from the exhaust system and prevent engine backfire.

As shown in block 404, the electronic control unit is operated to deactivate the combustion zone ignition source once there is no unburned fuel remaining in the exhaust stream. In such embodiments, the fuel injectors are deactivated to stop the fuel stream, thereby preventing formation of the mixture of air and fuel. In such embodiments, the unreacted mixture of air and fuel is provided to the exhaust treatment system via the air flow rate provided by the rotating engine.

In one or more embodiments, an unreacted mixture of air and fuel upstream of the flame arrestor is passed through the flame arrestor to the combustion zone of the exhaust line. In such embodiments, the combustion zone ignition source is activated such that the mixture of air and fuel is ignited in the combustion zone. In one or more embodiments, the fuel injectors are deactivated as the engine rotates until the unreacted gases, such as the mixture of air and fuel, upstream of the flame arrestor are below a combustible limit. The combustible limit may depend on the type of fuel being injected. A non-limiting example of a combustible limit is provided with a lower flammability limit of gasoline, which is less than 1.4 vol % (volume percent).

In one or more embodiments, a rate of exhaust gas flow in the motor system is sufficiently elevated such that the remaining mixture of unburned air and fuel in the combustion zone is removed from the exhaust treatment system. In such embodiments, the rate of exhaust gas flow prevents engine backfire via the removal of a mixture of unburned air and fuel in or proximate to the engine. Moreover, the engine may be configured such that engine backfire is not of a concern. In such embodiments, the exhaust treatment system may be configured without a flame arrestor described above.

In block 406, the electronic control unit may be operated to initiate regular operating conditions. Initiating regular engine operating conditions may include using the electronic control unit to activate the at least one spark plugs per cylinder of a cylinder bank. In such embodiments, the electronic control unit may reactivate the at least one fuel injectors of the cylinder bank to reintroduce a fuel stream to one or more cylinders of the cylinder bank of the engine. The at least one spark plugs per cylinder of the cylinder bank may then combust the mixture of air and fuel in each cylinder of the cylinder bank thereby establishing normal engine operation.

Embodiments of the present disclosure may provide at least one of the following advantages. The motor system of one or more embodiments may provide sufficient thermal energy to heat a catalyst to provide an activated catalyst, thereby reducing exhaust pollutants during an engine cold start phase.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range. While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A motor system comprising:

an engine having one or more cylinders;

an electronic control unit; and an exhaust treatment system in fluid connection with and downstream of the one or more cylinders, wherein the exhaust treatment system comprises:

an exhaust line;

a flame arrestor;

a combustion zone, wherein the flame arrestor is located upstream of the combustion zone;

a combustion zone ignition source in the combustion zone; and a catalyst downstream of and in thermal communication with the combustion zone.

2. The motor system of claim 1, the system further comprising an intake manifold, wherein the intake manifold is in fluid communication with the one more cylinders.

3. The motor system of claim 2, wherein the electronic control unit is configured to activate and deactivate at least one spark plugs independently disposed in the one or more cylinders, at least one fuel injectors independently disposed in the one or more cylinders, or both.

4. The motor system of claim 1, wherein the engine is a positive ignition engine or a compression ignition engine.

5. The motor system of claim 1, wherein the combustion zone ignition source is a spark plug, a glow plug, an electrical heating unit, or combinations thereof.

6. The motor system of claim 5, wherein the combustion zone ignition source is in thermal connection with the combustion zone and the catalyst.

7. The motor system of claim 5, wherein the electrical heating unit is coupled to the catalyst and in thermal communication with the combustion zone.

8. A method of heating a catalyst during an engine cold start, the method comprising:

providing a mixture of air and fuel to an exhaust treatment system, wherein the exhaust treatment system comprises:

an exhaust line;

a flame arrestor;

a combustion zone, wherein the flame arrestor is located upstream of the combustion zone;

an combustion zone ignition source disposed in the combustion zone; and a catalyst downstream of and in thermal communication with the combustion zone;

operating the combustion zone ignition source to combust the mixture of air and fuel, thereby generating a combustion gas in the exhaust treatment system; and heating the catalyst with the generated combustion gas.

9. The method of claim 8, wherein providing the mixture of air and fuel further comprises:

deactivating at least one spark plugs of one or more cylinders;

feeding an air stream to the one or more cylinders;

injecting a fuel stream using the at least one fuel injectors, thereby generating the mixture of air and fuel; and passing the mixture of air and fuel through the engine and into the exhaust line.

10. The method of claim 8, further comprising producing a combustion reaction of the mixture of air and fuel in the exhaust line, thereby generating a hot combustion gas.

11. The method of claim 8, wherein heating the catalyst further comprises contacting the catalyst with the heat generated from a combustion reaction, heat generated from the combustion zone ignition source, or combinations thereof.

12. The method of claim 11, wherein heating the catalyst further comprises:

heating the catalyst to an activation temperature, thereby providing an activated catalyst.

13. A method of initiating regular operating conditions of an engine having one or more cylinders, the method comprising:

heating a catalyst of an exhaust treatment system in fluid connection with the engine, wherein the exhaust treatment system comprises:

an exhaust line;

a flame arrestor;

a combustion zone, wherein the flame arrestor is located upstream of the combustion zone;

a combustion zone ignition source disposed in the combustion zone; and the catalyst downstream of and in thermal communication with the combustion zone;

operating an electronic control unit to deactivate the combustion zone ignition source; and operating the electronic control unit to initiate regular engine operating conditions.

14. The method of claim 13, wherein heating the catalyst comprises:

providing a mixture of air and fuel to the exhaust treatment system;

operating the combustion zone ignition source to combust the mixture of air and fuel, thereby generating a hot combustion gas; and heating the catalyst with the generated hot combustion gas.

15. The method of claim 14, wherein providing the mixture of air and fuel further comprises:

deactivating the combustion zone ignition source;

feeding an air stream to the engine;

injecting a fuel stream using at least one fuel injector of the engine, generating the mixture of air and fuel; and passing the mixture of air and fuel through the engine and into the exhaust line.

16. The method of claim 14, wherein providing the mixture of air and fuel comprises rotating the engine having the one or more cylinders.

17. The method of claim 14, wherein operating the combustion zone ignition source comprises producing a combustion reaction of the mixture of air and fuel in the exhaust line, thereby generating the hot combustion gas.

18. The method of claim 13, further comprising removing an unreacted mixture of air and fuel upstream of the combustion zone.

19. The method of claim 13, wherein operating the electronic control unit to initiate regular operating conditions of the engine further comprises:

deactivating a rotating motor of the engine;

activating the combustion zone ignition source; and activating at least one fuel injector of the one or more cylinders.

* * * * *